United States Patent [19]
McRae

[11] 4,378,870
[45] Apr. 5, 1983

[54] VEHICLE TORQUE CONVERTER

[76] Inventor: Edwin C. McRae, Box 922, Cusseta, Ala. 36852

[21] Appl. No.: 96,907

[22] Filed: Nov. 23, 1979

[51] Int. Cl.³ .............................................. B60K 41/28
[52] U.S. Cl. .................................. 192/3.24; 192/3.33; 192/3.27
[58] Field of Search ..................... 192/3.33, 3.24, 3.23, 192/3.34, 17 R, 12 R, 3.27, 17 A; 74/730, 731, 732, 688

[56] References Cited

U.S. PATENT DOCUMENTS

| Re. 22,967 | 1/1948 | Nutt et al. | 192/3.23 X |
| 2,135,282 | 11/1938 | Fottinger | 74/688 |
| 2,726,556 | 12/1955 | Greenlee | 192/3.23 X |
| 3,020,781 | 2/1962 | Burtnett | 74/688 |
| 3,772,939 | 11/1973 | Hause | 74/688 |

Primary Examiner—George H. Krizmanich

[57] ABSTRACT

This invention relates to improvements in a vehicle torque converter whereby the impeller element of the converter may be operatively locked to the turbine element for a direct mechanical drive to thereby eliminate the inefficiency inherent in such converters when functioning as fluid couplings. The invention also discloses means for reducing the torque transmitted by the converter when the vehicle's engine is idling and the vehicle's transmission is in gear.

3 Claims, 2 Drawing Figures

VEHICLE TORQUE CONVERTER

BACKGROUND AND SUMMARY OF MY INVENTION

This application relates in general to the same subject matter as is disclosed in my patent application for a Torque Converter Mechanism Ser. No. 96,653, filed on even date with this application. Specifically, application Ser. No. 96,653 discloses a two-range torque converter together with means for locking the impeller element of the converter to the turbine element thereof to obtain a direct or lock-up drive between the impeller and the turbine when the converter would otherwise be operating as a fluid coupling.

This application discloses an alternate means for locking the impeller to the turbine but is not concerned with the two-range feature disclosed in the above-identified application. This application also discloses means for reducing the torque transmitted by the converter when the engine is idling with the transmission in gear.

The power transmitted by the conventional vehicle torque converter varies roughly as the cube of the impeller speed. Thus, a converter which will transmit 100 H.P. at 2000 r.p.m. impeller speed will transmit about 5 H.P. at 500 r.p.m., the idling speed of the conventional automobile engine. Consequently, when a vehicle equipped with such converter is brought to a stop with the engine idling and the transmission in gear, the converter will still exert a driving force of about 5 H.P. At such time the converter's turbine is, of course, stationary with the vehicle transmission in low or starting gear so that the driving torque of the turbine is amplified by both the turbine's stator and the vehicle transmission. This results in a torque buildup of about 200 ft pounds on the vehicle propeller shaft. This torque is, of course, more if the engine is on fast idle as occurs for some time during engine warm up.

With my improved converter the turbine torque is not eliminated under idling conditions but the torque due to the converter buildup is eliminated and the torque generated by the fluid coupling effect is reduced so that the driving force on the propeller shaft when the engine is idling is less than half that of an equivalent size conventional converter.

In the normal operation of a motor vehicle the constantly applied driving force at engine idling speed is partly resisted by the rolling resistance of the vehicle but in most automobiles the rolling resistance is not sufficient to prevent the vehicle from moving. Consequently, to prevent such movement of the vehicle, the vehicle brakes must be continuously applied or the transmission shifted out of gear.

This characteristic of vehicle torque converters has long been recognized as a safety hazzard. For example, where such a vehicle is stopped for a traffic signal and the driver, thru error or because of distractions from any source, momentarily releases the brake pressure the vehicle immediately starts to move forwardly into the cross traffic and often will cause a collision with another vehicle which has the right of way.

With my improved converter, even through the power transmitted at idling speed of the engine is not reduced to zero, it is reduced sufficiently that the normal rolling resistance of the vehicle will prevent the vehicle from moving after it has once been stopped. Consequently, the brakes of the vehicle need not be continuously applied to keep it from moving forwardly.

A further advantage of my converter is that the engine, when idling, need develope less than half of its normal power so that a substantial saving in fuel results.

BRIEF DESCRIPTION OF THE DRAWING

Referring to FIG. 1 of the drawings, I have used the reference numeral 10 to indicate a torque converter housing which is secured to the flywheel end of a vehicle engine. The housing 10 forms an enclosure for an engine flywheel 11 together with my improved torque converter. This torque converter comprises a vaned impeller 12, a vaned turbine 13 and a vaned stator 14. These three members are of conventional construction, as my invention is not in the design of these members but in the way they are coupled together to give greater utility to the converter.

Figure 1:
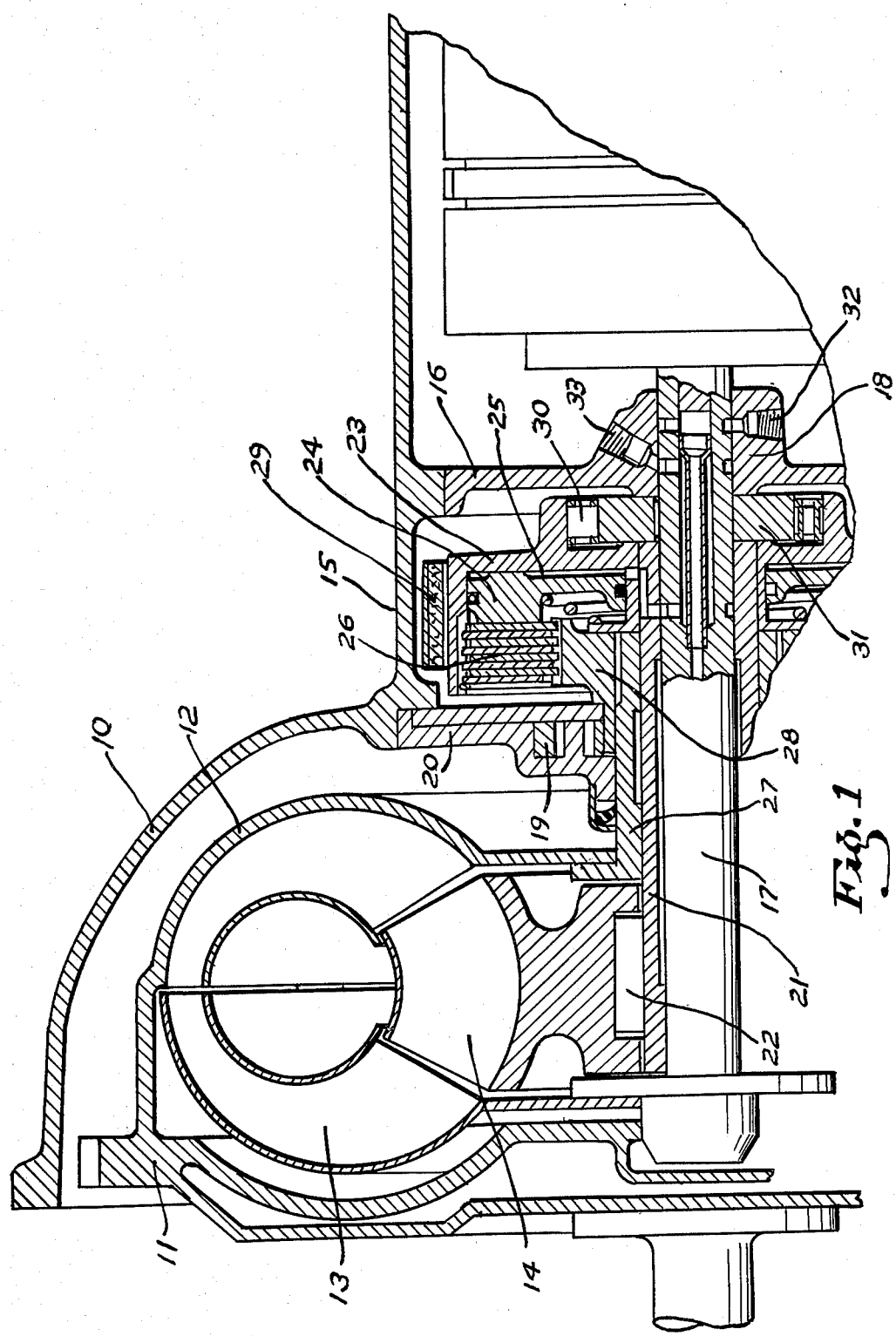
FIG. 1 is a central, sectional view through my converter.

A clutch housing 15 is positioned rearwardly of the turbine housing 10 and the rear wall of this clutch housing forms a bearing supporting plate 16. A turbine shaft 17 has its forward end fixed to the turbine 13 and extends rearwardly through the housings 10 and 15. The rear end of the shaft 17 is rotatably mounted in the plate 16 by means of an axial bore in a hub 18 which is formed on the plate 16. A hydraulic gear pump 19 is mounted on a pump plate 20 which forms a partition between the housings 10 and 15.

A stator sleeve 21 is rotatably mounted around the turbine shaft 17 and has its forward end connected to the stator either directly or through a conventional one way clutch 22 so that reverse rotation of the stator will at all times cause reverse rotation of the stator sleeve 21. The rear end of sleeve 21 extends into the housing 15 where it is fixed to the hub portion of a clutch member 23. The clutch member 23 thus rotates rearwardly at all times with the stator 14. An annular-shaped piston 24 is mounted in an annular cylinder 25 which is formed integrally with the member 23. A plurality of clutch plates 26 are disposed within the clutch member 23, each alternate plate being splined to the member 23. When oil pressure is applied to the rear portion of the piston 24 the clutch is engaged in the usual manner.

An impeller sleeve 27 is rotatably mounted around the sleeve 21 and has its forward end fixed to the impeller 12. The rear portion of the sleeve 27 extends through the plate 20 where it is fixed to a driving clutch drum 28. The clutch plates 26 which are not splined to member 23 are splined to the drum 28 to form a piston-operated, multiple-disc clutch.

A keyed connection is formed between the drum 28 and the gear pump 19 so that at all times that the impeller 12 is being driven, the pump 19 is operating. If the piston 24 is activated by fluid from the pump 19, the clutch member 23 is coupled to the impeller 12 and rotates as a unit with such impeller.

When the converter is functioning under load as a fluid coupling the stator 14 rotates forwardly about 90% of engine speed. When the converter functions to buildup torque the stator is held from reverse rotation by an operative brake band 29 which is positioned around the clutch member 23 and when applied, anchors the member 23 to the housing 15. The torque buildup accomplished by the converter is thus resisted by the housing 15. In this situation the clutch member 23 functions as a brake drum to resist rearward rotation of the stator 14.

In order to mechanically lock-up the converter elements when the converter would otherwise function as a fluid coupling, I have provided an overrunning clutch 30 which prevents the stator sleeve 21 from overrunning the turbine shaft 17 in a forward direction. To accomplish this I have provided a ring 31 which is keyed to the turbine shaft 17 and the overrunning clutch 30 is positioned between the ring 31 and the clutch member 23 to thereby prevent the member 23 from rotating forwardly faster than the turbine shaft 17.

In normal operation, the clutch plates 26 are disengaged when the converter acts as a conventional unit. When the converter reaches a speed at which the stator rotates forwardly the converter functions as a fluid coupling. At this time the clutch plates are engaged to lock-up the impeller to the stator and by means of the overrunning clutch 30, to effectively lock the impeller to the turbine shaft to obtain a direct mechanical drive from the engine to the turbine in a forward direction. At such time the converter still rotates but ceases to function as either a converter or fluid coupling.

Fluid under pressure is supplied from the pump 19 to the converter in the conventional manner thru a port 32 in the hub 18. Fluid under pressure is also supplied to the clutch piston 24 thru another port 33 in the hub 18.

Figure 2:
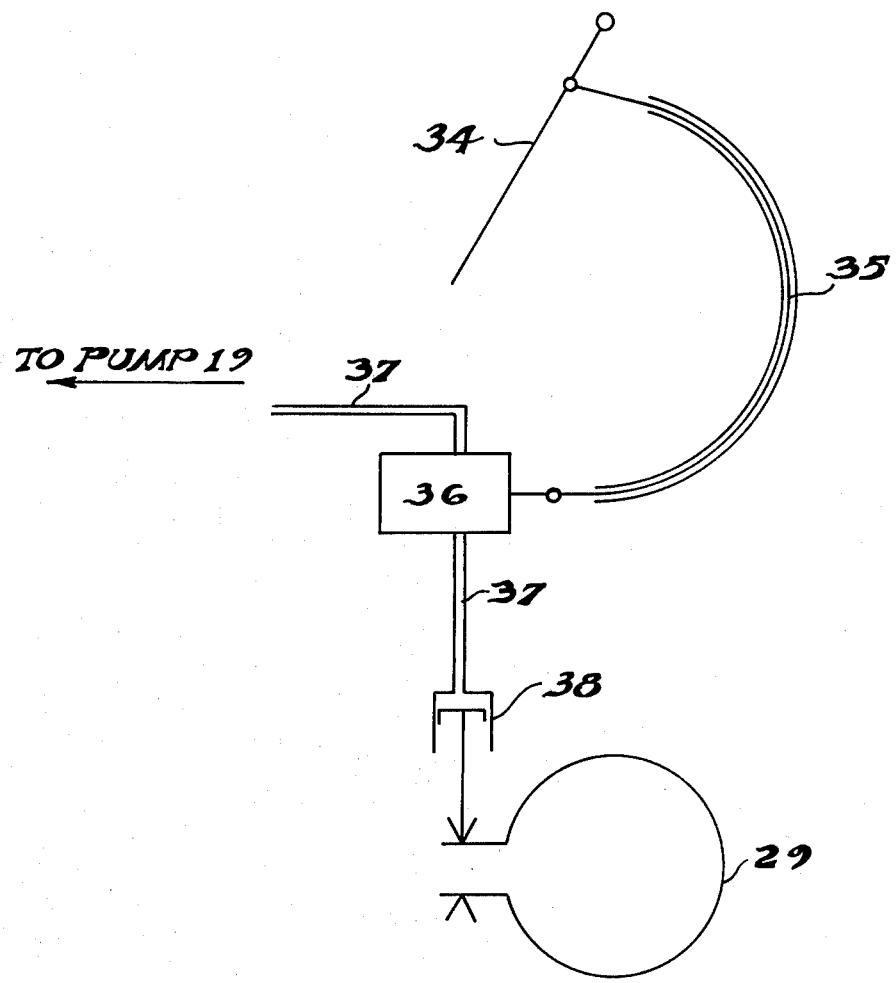
FIG. 2 is a diagrammatic view showing a conventional vehicle accelerator pedal and its connection to a control valve so that at engine idling speed the convertor stator is permitted to rotate freely in a reverse direction and when the accelerator pedal is actuated the stator is held against reverse rotation.

Referring to FIG. 2, it will be seen that I have provided a conventional accelerator pedal 34 which connected thru suitable linkage 35 with a control valve 36 so that when the pedal 34 is operating the engine at idling speed the valve 36 is closed and when the pedal 34 is depressed to accelerate the engine the valve 36 is opened. The valve 36 is inserted in an hydraulic line 37 which extends form the pump 19 to a piston and cylinder assembly 38 which actuates the brake band 29. Means, not shown in the drawing is provided for closing the valve 36 independently of the accelerator pedal when the clutch 26 is engaged to thereby permit forward rotation of the stator when the converter is locked up for highway driving.

In normal operation, the vehicle engine is started with the vehicle transmission in neutral position and the band 29 disengaged. The engine is then allowed to idle and the transmission shifted to a driving gear. At such time the stator 14 is permitted to rotate freely in a reverse direction so that no buildup of torque in the turbine results. The turbine, being held stationary by the driving wheels of the vehicle, actually discharges fluid through the stator into the impeller in a reverse direction so that the flow of fluid pumped by the impeller is reduced from that which would be pumped if the stator was held from reverse rotation. As the driving torque of the turbine is proportional to the amount of fluid pumped by the impeller it will be apparent that a reduced driving torque results. This reduced driving torque is usually insufficient to move the vehicle against the normal rolling resistance of the vehicle. The vehicle brakes need therefore not be applied to keep the vehicle from moving.

This may be better understood by considering that the amount of torque transferred from the impeller to the turbine in all torque converters is directly proportional to the amount of fluid pumped by the impeller. When the fluid enters the impeller it is thrown out radially by the impeller vanes but more importantly, it is accelerated circumferentially to the peripheral speed of the impeller. Energy is transferred to the turbine blades because these blades slow down the circumferential speed of the fluid and, if the turbine is held from forward rotation, discharge the fluid into the stator in a reverse direction.

The sole function of the stator in a conventional converter is to forwardly accelerate the circumferential speed of the fluid as it enters the impeller. When the stator is held from reverse rotation the stator blades change the reverse flow of the fluid from the turbine into a forward circumferential flow as it enters the impeller to thereby permit more fluid to be pumped by the impeller.

If the stator is permitted to freely rotate rearwardly, the rearwardly moving fluid from the turbine is not directed forewardly so that it enters the impeller at the same rearward speed that it had when it was discharged from the turbine. The result is that for a given impeller speed less fluid will enter the impeller when the stator is permitted to rotate rearwardly than when the fluid is discharged forwardly into the impeller by a stationary stator. Because less fluid enters the impeller less power is required to accelerate it to the peripheral speed of the impeller and less torque is transferred to the turbine. This reduced turbine torque is, under ordinary driving conditions, insufficient to move the vehicle against the normal rolling resistance of the vehicle. The vehicle brakes need therefore not be applied to keep the vehicle from moving. From the above, it will be apparent that at a given throttle setting with the vehicle in gear, an engine will run faster when the stator is permitted to rotate freely in a reverse direction than when it is held from reverse rotation. However, at idling speed a vehicle engine need only run fast enough to prevent stalling so that with my improved construction the idle throttle setting may be reduced while still maintaining the desired idling speed. This results in a substantial saving in fuel consumed under normal city stop and go driving.

When it is desired to accelerate the vehicle the engine speed is increased and the band 29 is engaged with the member 23. The stator at such time is held from reverse rotation so that the converter functions in a normal manner. When the vehicle attains its normal driving speed where the converter would otherwise function as a fluid coupling, the band 29 is released and the clutch 23 is engaged to thereby mechanically lock the impeller to the stator and effectively lock the impeller to the turbine through the overrunning clutch 30 so that the vehicle engine and turbine rotate at a 1 to 1 ratio.

ENGINE RUNNING IN NEUTRAL MODE

In this mode it is immaterial as to whether or not the clutch plates 26 and band 29 are engaged or not, as the turbine shaft 17 may freely rotate at any speed.

ENGINE IDLING—VEHICLE IN GEAR MODE

In this mode the band 29 and clutch plates 26 are disengaged. The turbine 12 is held from rotation by the vehicle so that the fluid discharged from the turbine into the stator 14 is discharged in a reverse direction. The stator, being free to rotate rearwardly, discharges fluid into the impeller in a reverse direction. About 50% of the impeller torque is used to counteract the rearward flow of such fluid and the remainder used to accelerate such fluid to the peripheral speed of the impeller. As a result only about 50% of impeller torque is transmitted to the turbine.

ENGINE RUNNING AT SLIGHTLY ABOVE IDLING SPEED—VEHICLE STATIONARY BUT IN GEAR MODE

In this mode the band 29 is engaged and the clutch plates 26 are still disengaged. The stator 14 is held from reverse rotation so that fluid discharged therefrom is discharged forwardly into the impeller 12. In this mode the full torque of the impeller is used to accelerate the fluid. Consequently, only a slight increase in impeller speed above idling speed causes almost twice as much fluid to be pumped as is pumped at idling speed. The result is that only a slight increase in engine speed above idling speed almost doubles the torque transitted by the turbine.

ENGINE ACCELERATING MODE

In this mode the band 29 is still engaged with the clutch plates 26 still disengaged. The engine and vehicle accelerate until the turbine speed reaches about 85 to 90% of engine speed. This is normally the coupled up speed of the converter. The turbine can never reach engine speed because at such speed no fluid would be pumped by the impeller and consequently no torque would be transferred to the turbine.

DIRECT DRIVE MODE

When the vehicle has reached the normal coupled up speed of the converter the band 29 is released and the clutch plates 26 engaged. The impeller 12 is thereby mechanically locked to the clutch housing 23 and the overrunning clutch 30 mechanically locks the housing 23 to the turbine shaft 17. The entire torque of the engine is thus transmitted mechanically at a positive 1 to 1 ratio to the turbine shaft. The turbine in this mode rotates at engine speed so that no fluid is being pumped by the impeller and no torque is being transmitted hydraulicly to drive the vehicle.

Some changes may be made in the arrangement, construction and combination of the various parts of my improved torque converter and it is my intention to cover by my claims such changes as may reasonably be included within the scope thereof.

What I claim and desire to secure by U.S. Letters Patent is:

1. In a motor vehicle torque converter having impeller and turbine and stator members mounted to define a fluid circuit, a turbine shaft having one end fixed to said turbine with its other end connected to the driving wheels of the vehicle when said vehicle is operating at highway speeds, means disposed between said stator member and said turbine shaft for preventing the stator member from overrunning the turbine shaft in a forward direction, and an engageable-disengageable mechanical drive connection between said impeller and said stator which is effective in one operational mode to mechanically lock said impeller to said stator and which co-operates with said means to thereby mechanically lock said impeller to said turbine shaft to thereby eliminate at highway speeds of the vehical all of the slippage that would otherwise occur between said impeller and turbine.

2. A vehicle torque converter adapted for use in a motor vehicle in conjunction with a vehicle engine and transmission, said torque converter having impeller and turbine and stator members mounted to define a fluid circuit, a manually operated throttle control for said engine, said stator being mounted to rotate freely in a reverse direction when said transmission is in a forward driving position and said engine is operating at idling speed, and operative means for resisting reverse rotation of the stator member, said throttle control actuating said operative means to prevent reverse rotation of said stator member when said throttle control is actuated to increase the engine speed above its normal idling speed and said transmission is in a forward driving position.

3. In a motor vehicle torque converter having impeller and turbine and stator members mounted to define a fluid circuit and wherein the stator member is mounted for free rotation in a reverse direction independently of said impeller or turbine when the engine of said vehicle is operating at idling speed and the transmission associated with said vehicle is in a forward driving gear, operative means for resisting reverse rotation of the stator member, means for actuating said operative means when said engine speed is increased above its idling speed and said transmission is still in a forward driving gear, means disposed between said stator member and said turbine for preventing the stator member from overrunning the turbine member in a forward direction, and an engageable-disengageable mechanical drive connection which is effective in one operational mode to mechanically lock the impeller and stator members togather to thereby effectively mechanically lock said turbine to said impeller and thereby eliminate all of the slippage that would otherwise occur between the impeller and turbine thru the fluid circuit.

* * * * *